United States Patent

[11] 3,624,157

| [72] | Inventors | Raymond W. Ingwalson;<br>Nathan Dale Ledford, both of Chattanooga. Tenn. |
|---|---|---|
| [21] | Appl. No. | 886,022 |
| [22] | Filed | Dec. 17, 1969 |
| [45] | Patented | Nov. 30, 1971 |
| [73] | Assignee | Velsicol Chemical Corporation<br>Chattanooga, Tenn. |

[54] PROCESS FOR PREPARING ORTHO-CHLOROBENZALDEHYDE
9 Claims, No Drawings

[52] U.S. Cl. ................................................... 260/599,
260/651 R, 260/515 A
[51] Int. Cl. ................................................... C07c 47/54
[50] Field of Search ........................................... 260/599,
651 R, 515 A

[56] References Cited
UNITED STATES PATENTS

| 2,816,144 | 12/1957 | Harris | 260/651 R X |
| 2,965,682 | 12/1960 | Horvath | 260/651 R |
| 3,087,967 | 4/1963 | Graham et al. | 260/599 |
| 3,238,243 | 3/1966 | Falbe et al. | 260/651 R X |
| 3,467,697 | 9/1969 | Kohll et al. | 260/651 R X |
| 3,524,885 | 8/1970 | Deinet | 260/599 |

FOREIGN PATENTS

| 9.107 | 12/1908 | Great Britain | 260/599 |

Primary Examiner—Bernard Helfin
Attorney—Robert J. Schwarz

ABSTRACT: This invention discloses a process for preparing orthochlorobenzaldehyde which comprises chlorinating the side chains of a mixture of ortho- and para-chlorotoluene containing from about 50 to about 85 percent by weight of the orthoisomer in the liquid phase with chlorine gas until the ratio of orthochlorobenzal chloride to parachlorobenzal chloride in the reaction mixture is at least about 10 to 1 by weight, hydrolyzing the resulting mixture to the corresponding benzaldehyde and benzoic acids and thereafter recovering the orthochlorobenzaldehyde therefrom.

PROCESS FOR PREPARING ORTHO-CHLOROBENZALDEHYDE

This invention relates to a chemical process and more particularly relates to a method of preparing orthochlorobenzaldehyde from a starting mixture of ortho- and para-chlorotoluene.

Chlorobenzaldehyde is readily prepared by the hydrolysis of chlorobenzal chloride. Chlorobenzal chloride is prepared by the side-chain chlorination of the corresponding chlorotoluene. The chlorotoluene in turn is prepared by the ring chlorination of toluene. This ring chlorination of toluene however results in the formation of an isomeric mixture and predominantly in a mixture of ortho- and para-chlorotoluene. Thus, in order to prepare orthochlorobenzaldehyde free of its paraisomer by the above-described route it is necessary to start with pure orthochlorotoluene or perform a separation on the isomeric product mixture.

Orthochlorotoluene free from its paraisomer is difficult to prepare since the isomeric mixture obtained from the ring chlorination of toluene is not readily separated into its individual components. The similarity in boiling points of ortho- and para-chlorotoluene requires distillation equipment having about 100 theoretical plates for complete separation. The present invention obviates the use of such highly expensive equipment.

The separation of the reaction products, both the intermediate chlorobenzal stage or the final chlorobenzaldehyde stage, into the individual isomers suffers from similar difficulties as that of the chlorotoluenes. The separation of orthochlorobenzal chloride from the product mixture obtained from the side-chain chlorination of a mixture of ortho- and para-chlorotoluene is made particularly difficult by the possible presence of five additional products, namely, ortho- and para-chlorobenzyl chloride, parachlorobenzal chloride and ortho- and para-chlorobenzotrichloride, all of which have similar vapor pressure curves.

The vapor pressures of ortho- and para-chlorobenzaldehyde are again of such similarity as to make separation difficult. At 10 mm., 100 mm., and 760 mm. of mercury pressure, for example, the boiling points of the orthoisomer are 83°, 141° and 211° C. and of the paraisomer are 90°, 147° and 217° C. respectively.

It has now been found that orthochlorobenzaldehyde can be readily prepared from a starting mixture of ortho- and para-chlorotoluene without the use of difficult and costly separation steps. More specifically it has been found that by chlorinating the side-chains of a mixture of ortho- and para-chlorotoluene to within certain limits and thereafter hydrolyzing the resulting reaction products orthochlorobenzaldehyde can be obtained substantially free from its difficult to separate isomer.

The chlorination parameters required to obtain the unexpected results of the present invention can be defined in terms of the orthochlorobenzal chloride to parachlorobenzal chloride ratio in the chlorinated reaction mixture, a procedure which is independent of the isomer ratio of the starting materials, or in terms of a specific gravity range of the chlorination mixture, a procedure which is dependent on the particular isomer ratio of the starting materials employed.

The process of the present invention and the parameters which define its arise from the unexpected chlorination products distribution which results when an ortho- and para-chlorotoluene mixture containing from about 50 to about 85 percent of the orthoisomer is side chain chlorinated in the liquid phase with chlorine gas. Of particular significance is the discovery that under the above conditions as ortho- to para-chlorobenzal chloride product weight ratio of at least about 10 to 1 and as high as 50 to 1 and higher can be obtained at a time when the major portion of the orthochlorotoluene has been converted to the orthochlorobenzalchloride and the competing products, namely, orthochlorobenzal chloride and orthochlorobenzotrichloride, are present only in minor amounts. By ceasing chlorination within these specific limits and completely hydrolyzing the resulting reaction mixture an orthochlorobenzaldehyde product of at least 90 percent purity and as high as about 99 percent purity depending upon the isomer ratio of the starting materials and the particular degree to which the chlorination was carried out can be obtained.

Thus, one embodiment of the present invention resides in a process for preparing orthochlorobenzaledehyde which comprises chlorinating the side chains of a mixture of ortho- and para-chlorotoluene containing from about 50 to about 85 percent by weight of the orthoisomer in the liquid phase with chlorine gas until the ratio of orthochlorobenzal chloride to parachlorobenzal chloride in the reaction mixture is at least about 10 to 1 by weight, hydrolyzing the resulting mixture to the corresponding benzaldehyde and benzoic acids, and thereafter recovering the orthochlorobenzaldehyde therefrom.

The ratio of ortho- to para-chlorobenzal chloride in the reaction mixture can be readily determined by standard analytical procedures. The method which is particularly suitable for this purpose is a gas chromatographic analysis whereby relative proportions of components are simply ascertainable.

As indicated above, the chlorotoluenes are side chain chlorinated to an extent that the ratio of ortho- to para-chlorobenzal chloride contained in the product mixture is at least about 10 to 1. This chlorobenzal chloride ratio will generally result in an orthochlorobenzaldehyde product purity, after hydrolysis, of about 90 percent and higher. Chlorination to higher ratios of ortho- to para-chlorobenzal chloride is often desirable when a higher purity product is required and ratios of about 20 to 1 and about 50 to 1 will result in an orthochlorobenzaldehyde product purity of about 95 and about 98 percent respectively. The chlorination to a lower ratio than indicated will result in an increase of the undesirable parachlorobenzaldehyde which is so difficult to separate from its orthoisomer. The chlorination to the degree specified also results in the formation of ortho- and para-chlorobenzatrichloride which upon hydrolysis are converted to the corresponding benzoic acids and which can be readily separated as such from the desired orthochlorobenzaldehyde.

The relative proportions of the ortho- and para-chlorotoluenes which can be used as starting materials for the process of this invention can vary considerably without affecting the usefulness of the process. Generally, to obtain practical yields of orthochlorobenzaldehyde, a starting mixture containing at least about 50 percent by weight of orthochlorotoluene should be used. However, a preferred starting material mixture for this process contains from about 50 to about 85 percent by weight of orthochlorotoluene. A starting mixture containing a higher percentage of the orthoisomer, while useful in the present process, would no longer result in a product mixture which suffers from separation difficulties unless very pure products were desired. An orthochlorotoluene content of less than 50 percent by weight of the starting mixture results in excessively low yields of orthochlorobenzaldehyde.

As previously mentioned, the chlorination step of the process of this invention can also be defined in terms of the specific gravity of the reaction mixture. It has been found that when an ortho- and para-chlorotoluene mixture containing from about 50 to about 85 percent by weight of the orthoisomer is chlorinated to a corresponding specific gravity ranging from at least 1.445 to at least 1.415 respectively at 25° C. and is subsequently hydrolyzed an orthochlorobenzaldehyde product of at least about 90 percent purity is obtained. The specific gravity used herein is that of the chlorination products only and to the exclusion of any solvents or diluents which can be used in this process.

The specific gravity to which the reaction mixture is chlorinated is a function of the particular proportions or ortho- and para-chlorotoluenes which is employed as a starting material, and of the final product purity desired. The isomer proportion of starting materials is inversely proportional to the minimum specific gravity of the reaction mixture required for a 90 percent product purity. Thus the lower isomer ratios of starting material require the chlorination to a higher specific gravity require the chlorination to a higher specific gravity while the use of a higher ortho- to para-chlorotoluene ratio permits the chlorination to a lower specific gravity to attain a desired purity. Chlorination of the reaction mixture beyond the minimum specific gravity for a given starting mixture results in a product of higher purity. This further chlorination beyond the minimum for the purpose of greater product purity is limited however to within a certain range beyond which only a loss of desired product results. Generally, this range extends about 0.030 specific gravity units beyond the minimum specific gravity required for a 90 percent purity. In this manner it is possible to obtain orthochlorobenzaldehyde of a 98 percent and higher purity by the process of this invention.

Thus another embodiment of the present invention resides in a process for preparing orthochlorobenzaldehyde which comprises chlorinating the side chains of a mixture of ortho- and para-chlorotoluene containing from about 50 to about 85 percent by weight of the orthoisomer in the liquid phase with chlorine gas until the reaction mixture has attained a specific gravity corresponding proportionately to the isomer ratio in a range of from at least about 1.445 to at least about 1.415 respectively, hydrolyzing the resulting mixture to the corresponding benzaldehyde and benzoic acids, and thereafter recovering the orthochlorobenzaldehyde therefrom.

The manner in which the specific gravity of the reaction mixture can be utilized in carrying out the process of this invention is more specifically illustrated in the ensuing examples and the accompanying tables.

To effect the chlorination of ortho- and para-chlorotoluenes of the above indicated proportions conventional reaction equipment can be employed. Typically a reactor equipped with a gas inlet tube, a reflux condenser and temperature sensing and stirring means can be used. The chlorotoluene mixture can then be charged into the reactor and heated to a temperature ranging from about 80° C. to about 180° C. and preferably between about 100° and 160° C. Chlorine gas can be sparged into the reaction mixture until the ortho- to para-chlorobenzal chloride weight ratio is at least about 10 to 1 or until the specific gravity of the reaction mixture has attained the particular value as determined for a specific starting mixture.

This chlorination reaction can be catalyzed by standard means in the art such as the use of light or peroxide catalysts to initiate free radical formation.

In some instances it can be desirable to use an iron scavenger in the chlorination reaction for the purpose of inhibiting further ring chlorination of the chlorotoluenes. Chelating agents such as triphenylphosphine are useful for this purpose.

The hydrolysis of the reaction products obtained from the side-chain chlorination described above can be readily effected by standard techniques in the art. For example, the slow addition of water to the mixture of orthochlorobenzal chloride, orthochlorobenzotrichloride and parachlorobenzotrichloride at a temperature ranging from about 80° to about 160° C., and preferably at a temperature between about 130° and 160° C., in the presence of small amounts of hydrolysis catalyst such as strong mineral acids, including concentrated sulfuric acid and hydrochloric acid, basic materials including sodium hydroxide and potassium hydroxide, or metal halide salts such as zinc chloride, aluminum chloride and silver chloride will yield the desired orthochlorobenzaldehyde and the additionally useful and readily separable chlorobenzoic acids. Superatmospheric pressures can be advantageously employed in this hydrolysis and when used can obviate the use of catalyst.

The orthochlorobenzaldehyde can be simply recovered from the hydrolysis product mixture by adding sufficient aqueous alkali to the mixture to solubilize the chlorobenzoic acids in the aqueous phase, adding water immiscible organic solvent sufficient to dissolve the orthochlorobenzaldehyde, separating the organic phase from the aqueous phase and evaporating the organic solvent. Aqueous alkaline solutions such as dilute solutions of potassium or sodium hydroxide of about 5 to 30 percent concentration are particularly useful. The water immiscible organic solvent is used for the purpose of dissolving the o-chlorobenzaldehyde and to aid in its separation from the chlorobenzoic acids. Aromatic solvents such as toluene or xylene are preferred.

To recover the chlorobenzoic acids the alkaline aqueous fraction is acidified with a mineral acid such as hydrochloric acid to precipitate said benzoic acid in a pure state. The ortho- and para-chlorobenzoic acids can then be recovered by filtration and used as such or can be separated into the individual isomers by fractional crystallization or precipitation. This can be readily effected by using hot glacial acetic acid or acetone from which the parachlorobenzoic acid will precipitate upon cooling and can be recovered by filtration. The orthoisomer can be recovered upon evaporation of the remaining filtrate.

The process of the present invention is more specifically illustrated in the following examples.

EXAMPLE 1

Chlorination of Ortho- and Para-Chlorotoluene

A mixture of ortho- and para-chlorotoluene having an ortho- to para-isomer ratio of 55:45 was charged into a 5-liter flask equipped with a gas sparger, thermometer, mechanical stirrer and reflux condenser. The reaction mixture was heated to a temperature between about 100° and 160° C. and chlorine gas was sparged into the mixture at a rate of 0.5 pounds per hour. Chlorination was continued for a period of about 1,470 minutes after which time the reaction mixture has attained a specific gravity of 1.459 to 25° C. and an orthochlorobenzal chloride to parachlorobenzal chloride ratio of about 14 to 1. After this time the reaction mixture was cooled and upon gas chromatographic analysis was found to have the following composition

|  | Percent |
|---|---|
| Ortho-chlorobenzal chloride | 34.6 |
| Para-chlorobenzal chloride | 2.1 |
| Ortho-chlorobenzotrichloride | 19.7 |
| Para-chlorobenzotrichloride | 43.6 |

The following table sets forth both the relative proportions of ortho- and para-chlorobenzal chloride present in the total reaction mixture at given reaction times and the corresponding specific gravity of the reaction mixture from the process detailed in example 1. For the sake of brevity most of the early samples have been omitted in this table. The manner in which the benzal chlorides ratio as well as the specific gravity data can be utilized to obtain the desired results of this process becomes readily apparent from the following data:

TABLE I

| Sample Number | Reaction time (minutes) | Specific gravity at 25° C. | Ortho-chloro benzal chloride concn. | Para-chloro benzal chloride concn. |
|---|---|---|---|---|
| 11 | 150 | 1.152 | 0.6 | 1.4 |
| 15 | 270 | 1.191 | 1.7 | 3.7 |
| 20 | 420 | 1.237 | 5.4 | 9.5 |
| 26 | 630 | 1.285 | 9.8 | 16.4 |
| 30 | 750 | 1.318 | 18.3 | 18.3 |
| 36 | 930 | 1.362 | 32.7 | 32.3 |
| 40 | 1,050 | 1.379 | 40.3 | 30.7 |
| 45 | 1,200 | 1.410 | 46.1 | 21.7 |
| 46 | 1,230 | 1.415 | 47.1 | 19.1 |
| 47 | 1,260 | 1.421 | 45.7 | 14.1 |
| 48 | 1,290 | 1.429 | 44.6 | 11.9 |
| 49 | 1,320 | 1.437 | 43.7 | 9.2 |
| 50 | 1,350 | 1.442 | 40.5 | 5.8 |
| 51 | 1,380 | 1.448 | 36.1 | 4.0 |
| 52 | 1,410 | 1.454 | 34.4 | 1.8 |

EXAMPLE 2

Chlorination of Ortho- and Para-Chlorotoluene

A mixture of ortho- and para-chlorotoluene (1,500 grams) having an ortho- to para-isomer ratio of 65:35 and triphenylphosphine (1.5 grams) were charged into a 2-liter reaction vessel equipped with a gas sparger, thermometer, mechanical stirrer and reflux condenser. The reaction mixture was heated to a temperature of between about 100° and 160° C., with vigorous stirring, and chlorine gas was sparged into the mixture in the presence of light at a rate of about 0.5 pounds per hour until the reaction mixture contained an ortho- to para-chlorobenzal chloride weight ratio of 110 to 1 and acquired a specific gravity of 1.465 at 25° C. The chlorine addition required a period of about 10 hours. After this time the reaction mixture was cooled and upon gas chromatographic analysis was found to have the following compositions:

|  | Percent |
| --- | --- |
| Ortho-chlorobenzal chloride | 33.0 |
| Para-chlorobenzal chloride | 0.3 |
| Ortho-chlorobenzotrichloride | 31.9 |
| Para-chlorobenzotrichloride | 34.8 |

The chlorobenzal chloride contents and the specific gravity of the reaction mixture of example 2 at various chlorination stages are in the following table:

TABLE II

| Sample Number | Reaction time (minutes) | Specific gravity at 25° C. | Ortho-chloro benzal chloride concn. | Para-chloro benzal chloride concn. |
| --- | --- | --- | --- | --- |
| 7 | 345 | 1.308 | 20.4 | 16.7 |
| 9 | 385 | 1.330 | 28.7 | 21.4 |
| 11 | 435 | 1.358 | 40.3 | 24.4 |
| 13 | 485 | 1.375 | 48.8 | 23.4 |
| 15 | 520 | 1.397 | 53.4 | 18.9 |
| 17 | 585 | 1.410 | 54.0 | 13.5 |
| 19 | 630 | 1.428 | 53.1 | 6.3 |
| 21 | 675 | 1.452 | 39.7 | 1.1 |
| 23 | 695 | 1.465 | 33.0 | 0.3 |

EXAMPLE 3

Hydrolysis of the Chlorination Products

The chlorination product mixture from example 2 (1,000 grams) and zinc chloride (1.0 grams) were charged into a 2-liter reaction vessel equipped with a mechanical stirrer and reflux condenser. The reaction mixture was heated at a temperature between about 140° and 160° C. and water (135 grams) was added over a period of about 4 hours to completely hydrolyze the reaction mixture and to yield a mixture of orthochlorobenzaldehyde (174.9 grams), orthochlorobenzoic acid (212.4 grams), parachlorobenzaldehyde (4.9 grams) and parachlorobenzoic acid (228.2 grams).

EXAMPLE 4

Separation of Products

An aqueous solution of sodium hydroxide was added to the reaction products of example 3 in an amount sufficient to solubilize the ortho- and para-chlorobenzoic acids which are present as solid products. Toluene (500 ml.) was added as a solvent for the aldehyde and the two phases were separated. The aqueous phase was washed with toluene and the toluene fractions were combined. The toluene fraction was then stripped of solvent by distillation to yield orthochlorobenzaldehyde (92 percent assay).

The aqueous alkaline solution containing the chlorobenzoic acids was acidified with hydrochloric acid to precipitate the benzoic acids. The precipitate was recovered by filtration to yield a mixture of ortho- and para-chlorobenzoic acid (100 percent assay) having an isomer distribution of 48.2 percent ortho and 51.8 percent para.

EXAMPLE 5

Chlorination of Ortho- and Para-Chlorotoluene

A mixture of ortho- and para-chlorotoluene (2,600 grams) having an ortho- to para-isomer ratio of 76:24 was charged into a 5-liter reaction vessel equipped with a gas sparger, thermometer, mechanical stirrer and reflux condenser. The reaction mixture was heated to a temperature between about 100° and 160° C. and chlorine gas was sparged into the mixture, with vigorous stirring, in the presence of light and triphenylphosphine (2.6 grams) at a rate of about 0.5 pounds per hour. Chlorination was continued until the reaction mixture contained an ortho- to para-chlorobenzal chloride weight ratio of 12.5 to 1 and acquiring a specific gravity of 1.423 at 25° C. and requiring a reaction time of about 15 hours. After this time the reaction mixture was cooled and upon gas chromatographic analysis was found to have the following composition:

|  | Percent |
| --- | --- |
| Ortho-chlorobenzal chloride | 61.2 |
| Para-chlorobenzal chloride | 4.9 |
| Ortho-chlorobenzotrichloride | 13.7 |
| Para-chlorobenzotrichloride | 19.9 |

The specific gravity and ortho- and para-chlorobenzal chloride content of the reaction mixture of example 5 are shown in the following table.

TABLE III

| Sample Number | Reaction time (minutes) | Specific gravity at 25° C. | Ortho-chloro benzal chloride concn. | Para-chloro benzal chloride concn. |
| --- | --- | --- | --- | --- |
| 1 | 45 | 1.102 | 0.1 |  |
| 2 | 80 | 1.135 | 0.5 | 0.2 |
| 3 | 110 | 1.160 | 1.0 | 0.7 |
| 4 | 140 | 1.177 | 1.6 | 1.2 |
| 5 | 190 | 1.203 | 3.0 | 1.8 |
| 6 | 280 | 1.242 | 6.6 | 4.1 |
| 7 | 340 | 1.265 | 10.6 | 5.5 |
| 8 | 400 | 1.286 | 16.5 | 8.5 |
| 9 | 460 | 1.309 | 24.6 | 11.6 |
| 10 | 520 | 1.326 | 31.1 | 12.9 |
| 11 | 570 | 1.338 | 36.1 | 15.3 |
| 12 | 620 | 1.352 | 46.0 | 16.0 |
| 13 | 675 | 1.369 | 53.9 | 15.9 |
| 14 | 745 | 1.386 | 60.5 | 14.0 |
| 15 | 810 | 1.401 | 65.8 | 11.1 |
| 16 | 860 | 1.414 | 63.3 | 7.1 |
| 17 | 900 | 1.423 | 61.2 | 4.9 |

EXAMPLE 6

Hydrolysis of the Chlorination Products

The chlorination product of example 5 (3,000 grams) and zinc chloride catalyst (3.0 grams) were charged into a 5-liter reaction vessel equipped with a mechanical stirrer and reflux condenser. Toluene (150 grams) was added to the reaction vessel for the purpose of inhibiting sublimation of the chlorobenzoic acid products during hydrolysis. The reaction mixture was then heated to a temperature between about 140° and 160° C. and water (336 grams) was added over a period of about 2 hours to completely hydrolyze the reaction mixture and to yield a mixture of orthochlorobenzaldehyde (1,165.8 grams), orthochlorobenzoic acid (244.3 grams), parachlorobenzaldehyde (93.7 grams) and parachlorobenzoic acid (361.9 grams).

EXAMPLE 7

Separation of Products

Aqueous sodium hydroxide was added to the reaction products of example 6 until all of the solid chlorobenzoic acids dissolve. Toluene was added to the reaction mixture to dissolve the aldehydes and the organic phase was separated from the aqueous phase. The toluene fraction was then distilled through a 15-plate distillation column to yield orthochlorobenzaldehyde of 96.2 percent purity. The aqueous alkaline fraction was acidified with hydrochloric acid to precipitate a mixture of ortho- and para-chlorobenzoic acids. The benzoic acids were recovered by filtration and were dissolved in glacial acetic acid. Benzene was added to this solution and the mixture was refluxed to remove water by azeotrope. After complete drying, the benzene was stripped from the solution and the remaining solution was cooled to precipitate parachlorobenzoic acid. A second crop of the paraisomer was obtained upon concentrating the solution by distilling off part of the acetic acid resulting in a total of 361.9 grams of the paraisomer. The filtrate from the second crop of parachlorobenzoic acid was then flooded with water to precipitate the orthochlorobenzoic acid. This precipitate was recovered by filtration to yield 244.3 grams of the orthoisomer.

EXAMPLE 8

Chlorination of Ortho- and Para-Chlorotoluene

A mixture of ortho- and para-chlorotoluene (2,000 grams) having an ortho- to para-isomer ratio of 50:50 and triphenylphosphine (2.0 grams) are charged into a glass reaction vessel equipped with a gas sparger, thermometer, mechanical stirrer and reflux condenser. The reaction mixture is heated to a temperature of about 140° to 150° C. and chlorine gas is sparged into the mixture in the presence of light at a rate of 0.5 pounds per hour until the reaction mixture contains an ortho- to para-chlorobenzal chloride ratio of 10 to 1 weight to yield a mixture consisting substantially of orthochlorobenzal chloride, orthochlorobenzotrichloride and parachlorobenzotrichloride.

EXAMPLE 9

Hydrolysis of the Chlorination Products

The chlorination product mixture of example 8 (1,000 grams) and zinc chloride (1.0 grams) are charged into a 2-liter glass reaction vessel equipped with a mechanical stirrer and reflux condenser. The reaction mixture is heated to a temperature between about 140° and 160° C. and sufficient water to completely hydrolyze the mixture is added over a period of about 3 hours resulting in the desired products orthochlorobenzaldehyde, orthochlorobenzoic acid and parachlorobenzoic acid.

EXAMPLE 10

Separation of Products

Aqueous potassium hydroxide (15 percent solution) is added to the reaction products of example 9 in an amount sufficient to solubilize both the ortho-and para-chlorobenzoic acids. The entire mixture is then extracted with toluene to recover the orthochlorobenzaldehyde. The remaining aqueous phase is acidified to precipitate a mixture of ortho- and para-chlorobenzoic acids. This mixture of benzoic acids is subjected to fractional crystallization from acetone to yield the individual isomers.

EXAMPLE 11

Chlorination of Ortho- and Para-Chlorotoluene

A mixture of ortho- and para-chlorotoluene (2,000 grams) having an ortho- to paraisomer ratio of 85:15 and triphenylphosphine (2.0 grams) are charged into a glass reaction vessel equipped with a gas sparger, thermometer, mechanical stirrer and reflux condenser. The reaction mixture is heated to a temperature between about 130° and about 160° C. and chlorine gas is sparged into the reaction mixture at a rate of 0.5 pounds per hour until the reaction mixture contains an ortho- to para-chlorobenzal chloride ratio of 10 to 1 by weight.

EXAMPLE 12

Hydrolysis of the Chlorination Products

The chlorination product mixture of example 11 (1,000 grams) and zinc chloride (1.0 grams) are charged into a 2-liter glass reaction flask equipped with a thermometer, a mechanical stirrer and a reflux condenser. The reaction mixture is then heated to a temperature between about 80° and 100° C. and sufficient water to completely hydrolyze the reaction mixture is added over a period of about 4 hours resulting in the desired products orthochlorobenzaldehyde, orthochlorobenzoic acid and parachlorobenzoic acid.

EXAMPLE 13

Separation of Products

Aqueous sodium hydroxide (15 percent solution) is added to the reaction products of example 12 in an amount sufficient to solubilize both the ortho- and para-chlorobenzoic acids. The entire mixture is then extracted with xylene to recover the orthochlorobenzaldehyde. The remaining aqueous phase is acidified with a strong mineral acid to precipitate the mixture of ortho- and para-chlorobenzoic acids. This mixture of benzoic acids is subjected to fractional crystallization from acetone to yield the individual isomers.

We claim:

1. A process for preparing orthochlorobenzaldehyde which comprises chlorinating the side chains of a mixture of ortho- and para-chlorotoluene containing from about 50 to 85 percent by weight of the orthoisomer in the liquid phase with chlorine gas until the ratio of orthochlorobenzal chloride to parachlorobenzal chloride in the reaction mixture is at least about 10 to 1 by weight, hydrolyzing the resulting mixture to the corresponding benzaldehyde and benzoic acids and thereafter recovering the orthochlorobenzaldehyde therefrom.

2. The process of claim 1 wherein the hydrolysis comprises adding water to the reaction mixture in the presence of from about 0.01 to about 1.0 percent by weight of the total mixture of a hydrolysis catalyst while maintaining the temperature of the reaction mixture between about 80° and 160° C.

3. The process of claim 1 wherein the orthochlorobenzaldehyde is recovered by adding sufficient aqueous alkali to the hydrolyzed reaction mixture to solubilize the chlorobenzoic acids in the aqueous phase, adding water immiscible organic solvent sufficient to dissolve the orthochlorobenzaldehyde, separating the organic phase from the aqueous phase and evaporating the organic solvent.

4. The process of claim 3 wherein the aqueous alkali is aqueous sodium or potassium hydroxide.

5. The process of claim 3 wherein the organic solvent is an aromatic solvent.

6. The process of claim 3 wherein the organic solvent is selected from the group consisting of benzene, toluene and xylene.

7. A process for preparing orthochlorobenzaldehyde which comprises chlorinating the side chains of a mixture of ortho- and para-chlorotoluene containing from about 50 to about 85 percent by weight of the orthoisomer in the liquid phase with chlorine gas until the reaction mixture has attained a specific gravity corresponding proportionately to the isomer ratio in a range of from at least about 1.445 to at least about 1.415 respectively, hydrolyzing the resulting mixture to the corresponding benzaldehyde and benzoic acids, and thereafter recovering the orthochlorobenzaldehyde therefrom.

8. The process of claim 7 wherein the hydrolysis comprises adding water to the reaction mixture in the presence of a hydrolysis catalyst while maintaining the temperature of the reaction mixture between about 80° and about 160° C.

9. The process of claim 7 wherein the orthochlorobenzaldehyde is recovered by adding sufficient aqueous alkali to the hydrolyzed reaction mixture to solubilize the chlorobenzoic acids in the aqueous phase, adding water immiscible organic solvent sufficient to dissolve the orthochlorobenzaldehyde, separating the organic phase from the aqueous phase and evaporating the organic solvent.

* * * * *